(12) United States Patent
Dillon

(10) Patent No.: US 10,698,139 B2
(45) Date of Patent: Jun. 30, 2020

(54) DIFFUSE REFLECTING OPTICAL CONSTRUCTION

(71) Applicant: Stephen M. Dillon, Scottsdale, AZ (US)

(72) Inventor: Stephen M. Dillon, Scottsdale, AZ (US)

(*) Notice: Subject to any disclaimer, the term of this patent is extended or adjusted under 35 U.S.C. 154(b) by 0 days.

(21) Appl. No.: 15/330,529

(22) Filed: Oct. 3, 2016

(65) Prior Publication Data

US 2018/0095197 A1    Apr. 5, 2018

(51) Int. Cl.

| G02B 5/02 | (2006.01) |
| B29D 11/00 | (2006.01) |
| B05D 7/00 | (2006.01) |
| B05D 5/06 | (2006.01) |
| B05D 1/02 | (2006.01) |
| B05D 3/06 | (2006.01) |

(52) U.S. Cl.
CPC ............ *G02B 5/0268* (2013.01); *B05D 1/02* (2013.01); *B05D 5/06* (2013.01); *B05D 7/536* (2013.01); *B29D 11/0073* (2013.01); *B29D 11/00326* (2013.01); *G02B 5/0221* (2013.01); *G02B 5/0226* (2013.01); *G02B 5/0236* (2013.01); *G02B 5/0278* (2013.01); *G02B 5/0284* (2013.01); *B05D 3/067* (2013.01); *B05D 2201/02* (2013.01); *B05D 2203/35* (2013.01)

(58) Field of Classification Search
CPC .................................................. G02B 5/0268
See application file for complete search history.

(56) References Cited

U.S. PATENT DOCUMENTS

| 4,315,665 A | 2/1982 | Haines |
| 4,715,702 A | 12/1987 | Dillon |
| 4,838,673 A | 6/1989 | Richards et al. |
| 4,840,444 A | 6/1989 | Hewitt |
| 4,873,029 A | 10/1989 | Blum |
| 4,934,792 A | 6/1990 | Tovi |
| 5,073,009 A | 12/1991 | Tovi |
| 5,147,585 A | 9/1992 | Blum |
| 5,219,497 A | 6/1993 | Blum |
| 5,316,791 A * | 5/1994 | Farber .................. B05D 7/544 427/164 |
| 5,432,623 A | 7/1995 | Egan et al. |

(Continued)

*Primary Examiner* — Alex A Rolland
(74) *Attorney, Agent, or Firm* — William E. Hein

(57) ABSTRACT

A diffuse reflecting optical construction that does not rely on special molds or tooling of the prior art in order to create a critical diffuse reflecting surface feature of the optical construction. An atomized spray method is employed to apply a hardenable transparent liquid polymer layer to the surface of a prefabricated base optical substrate. The polymer layer forms beads on the surface of the prefabricated base optical substrate, resulting in the formation of a surface having a random and continuous series of peaks and valleys thereon that form the diffuse reflecting surface feature. The prefabricated base optical substrate having the diffuse reflecting polymer layer thereon combined with additional optical layers forms a transparent diffuse reflecting optical construction that can be used in the manufacture of optical lenses, windows, and transparent films that reflect light in a diffuse manner while transmitting light in a substantially undistorted manner.

24 Claims, 3 Drawing Sheets

(56) References Cited

U.S. PATENT DOCUMENTS

| | | |
|---|---|---|
| 5,464,710 A | 11/1995 | Yang |
| 5,512,371 A | 4/1996 | Gupia et al. |
| 5,550,599 A | 8/1996 | Jannard |
| 5,702,819 A | 12/1997 | Gupia et al. |
| 5,757,459 A | 5/1998 | Bhalakia et al. |
| 5,928,718 A | 7/1999 | Dillon |
| 6,020,983 A | 2/2000 | Neu et al. |
| 6,159,397 A | 12/2000 | Friedman |
| 6,231,183 B1 | 5/2001 | Dillon |
| 6,416,178 B1 | 7/2002 | Friedman |
| 6,535,337 B1 | 3/2003 | Tanaka et al. |
| 6,719,928 B2 | 4/2004 | Dillon |
| 6,793,339 B1 | 9/2004 | Yip et al. |
| 7,443,608 B2 * | 10/2008 | Dillon ............... G02C 7/021 359/601 |
| 7,468,203 B2 | 12/2008 | Hicks |
| 7,719,777 B2 | 5/2010 | Dillon |
| 8,007,896 B2 | 8/2011 | Hicks |
| 9,244,201 B2 | 1/2016 | Dillon |
| 2007/0268587 A1 | 11/2007 | Ninomiya |
| 2010/0039708 A1 | 2/2010 | Suzuki et al. |
| 2010/0086743 A1* | 4/2010 | Wang ............... G02B 5/0221 428/172 |
| 2010/0239789 A1 | 9/2010 | Umeda |
| 2013/0271840 A1* | 10/2013 | Dillon ............... G02B 1/105 359/599 |
| 2014/0020783 A1* | 1/2014 | Zazovsky ............ F16L 9/00 138/141 |
| 2014/0010469 A1 | 4/2014 | Yuan et al. |
| 2015/0249166 A1 | 9/2015 | Iitsuka et al. |
| 2017/0269380 A1 † | 9/2017 | Liao |

\* cited by examiner

† cited by third party

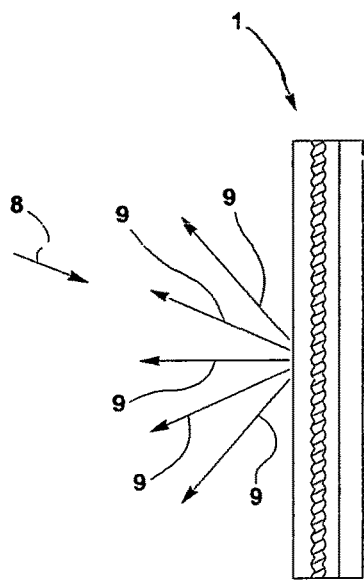
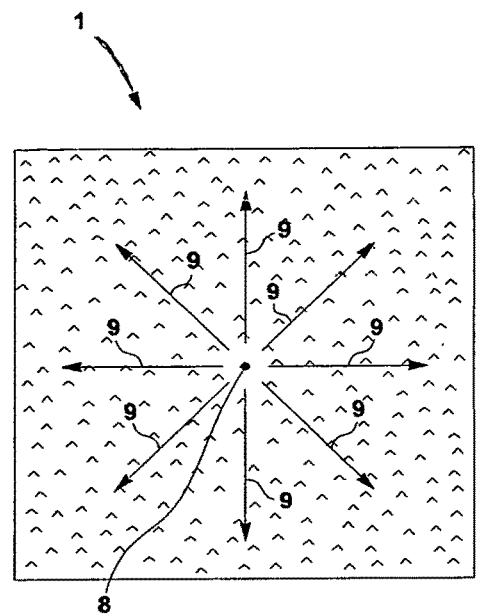
Fig. 7A  Fig. 7B
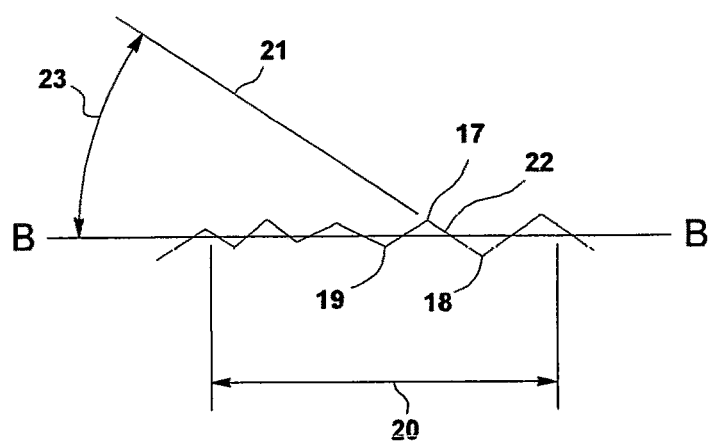
Fig. 8

DIFFUSE REFLECTING OPTICAL CONSTRUCTION

BACKGROUND AND SUMMARY OF THE INVENTION

The present invention relates to the manufacture of a diffuse reflecting optical construction incorporating a lower cost and more efficient process for creating an element of the optical construction that has a roughened textured surface finish comprised of a continuous series of peaks and valleys. The manner in which this type of surface is normally created in an optical construction of the subject type is by first creating the roughened textured surface finish in a tool, such as a mold or an embossing tool, which is subsequently used to replicate the surface finish in a light transmitting lens element that is cast or injection molded or in a light transmitting sheet that is embossed. The result is that the surface of the lens or sheet element replicates the roughened textured surface finish of the tool that is employed to create it. Exemplary of the prior art are U.S. Pat. Nos. 7,443,608; 7,719,777; and 9,244,201.

The present invention does not rely on the special molds or tooling described in the prior art to create the described roughened textured surface finish. Instead, a spray method is utilized to apply a light transmitting polymer coating, referred to herein as a diffuse reflecting optical layer, in a manner that creates, on its surface, a roughened textured finish forming a continuous series of peaks and valleys, thus eliminating the need for specialized tooling that is susceptible to wear or damage resulting in increased production costs, manufacturing slowdowns and irregularities. The diffuse reflecting optical construction taught herein may be advantageously employed in windows for homes, commercial buildings, and automobiles or in goggles, face shields or sunglass lenses. Optical lenses, goggle lenses, face shields, windows, and transparent films constructed in accordance with the present invention serve to reflect light in a diffuse manner while transmitting light in a substantially undistorted manner.

BRIEF DESCRIPTION OF THE DRAWINGS

FIG. 7A is a cross-sectional diagram illustrating the way in which light is reflected from the diffuse reflecting optical construction of FIG. 2.

FIG. 7B is a plan view diagram illustrating how light reflects from the diffuse reflecting optical construction of FIGS. 2 and 7A.

FIG. 8 is a cross-sectional instructional diagram of a rough textured surface finish illustrating the measurement of surface features.

DESCRIPTION OF THE PREFERRED EMBODIMENT

In summary, the diffuse reflecting optical construction of the present invention is fabricated by utilizing a new process for creating an element of the optical construction that is a surface finish comprised of peaks and valleys and that reflects light in a diffuse manner.

The subject diffuse reflecting optical construction includes a prefabricated light transmitting base optical substrate having a first surface. A layer of a hardenable light transmitting liquid polymer, referred to as a diffuse reflecting optical layer, is applied by a spray technique to the first surface of the prefabricated light transmitting base optical substrate and is then cured to a solid state in an open atmospheric environment. The surface of the diffuse reflecting optical layer is a diffuse reflecting surface. The polymer material from which the diffuse reflecting optical layer is fabricated is transparent. The diffuse reflecting surface of the diffuse reflecting optical layer is a multiplicity of peaks and valleys that provides an uneven surface to which a reflective medium is applied. The reflective medium, such as aluminum, for example, is thin, measuring generally only a few angstroms in thickness, and can be applied by the well-known processes of sputter coating or vacuum deposition. The reflective medium reflects a fraction of the light impinging thereon and allows the remainder to pass through. A layer of a hardenable light transmitting liquid polymer is then applied to the surface of the reflective medium and cured to a solid state. The light transmitting liquid polymer layer is applied such that it conforms to and fills the peaks and valleys of the diffuse reflecting optical layer. In one embodiment of the invention, it provides, by means of surface tension rather than by means of a mold, an outer surface that is substantially optically smooth.

Figure 1:
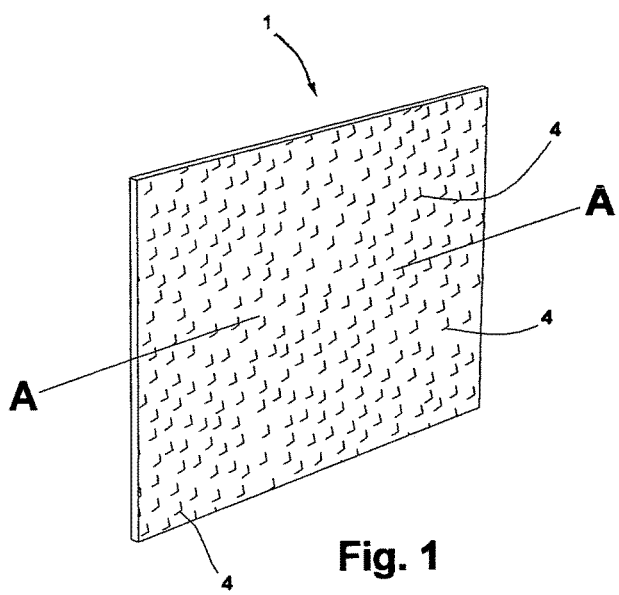
FIG. 1 is a perspective view of the diffuse reflecting optical construction in accordance with the present invention.
Figure 2:
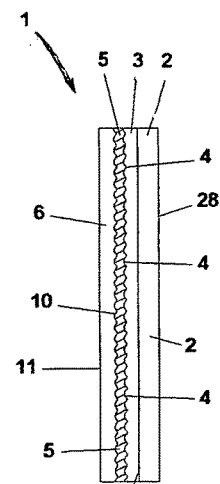
FIG. 2 is a cross-sectional diagram of the diffuse reflecting optical construction of FIG. 1, taken along section line A-A.

Referring now to FIGS. 1-2, there is shown a diffuse reflecting optical construction 1 that reflects light in a diffuse manner and transmits light in a substantially undistorted manner. A cross-sectional view of diffuse reflecting optical construction 1, taken along section line A-A of FIG. 1, and illustrating individual optical elements thereof, is presented in FIG. 2. These optical elements are a prefabricated light transmitting base optical substrate 2; a hardenable light transmitting liquid polymer layer sprayed onto base optical substrate 2 to create a diffuse reflecting optical layer 3 having a surface that includes a multiplicity of peaks and valleys 4, a reflective medium 5, and an optical layer 6 that conforms to and fills the peaks and valleys 4 created by diffuse reflecting optical layer 3 and that provides an outer surface 11 that is substantially optically smooth. The inverted "V" symbols of FIG. 1 represent the peaks and valleys 4 on the surface of the diffuse reflecting optical layer 3, highlighted by the reflective medium 5. Base optical substrate 2 is referred to as being prefabricated because the process of creating the diffuse reflecting optical construction 1 begins with a lens that was previously manufactured, that lens being the foundation upon which the layers, recited above as forming the diffuse reflecting optical construction 1, are applied.

Figure 3:
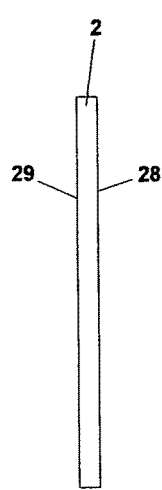
FIG. 3 is a cross-sectional diagram of one of the optical elements of FIG. 2.
Figure 4:
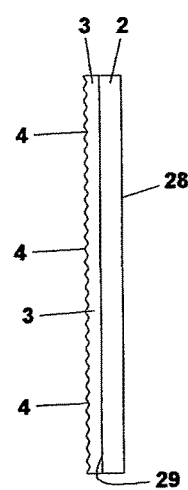
FIG. 4 is a cross-sectional diagram illustrating the application of a sprayed polymer layer to the surface of the optical element illustrated in FIG. 3.

Referring now to FIG. 3, there is shown the prefabricated light transmitting base optical substrate 2 prior to application of the diffuse reflecting optical layer 3 onto surface 29 of base optical substrate 2. Outer surfaces 28, 29 of base optical substrate 2 are preferable optically smooth. Base optical substrate 2 may be made of a transparent thermoset plastic, a thermoplastic, glass or a film sheet, such as polyester film. Referring now to FIG. 4, there is shown base optical substrate 2 having diffuse reflecting optical layer 3 applied to surface 29 thereof. Peaks and valleys 4 of the diffuse reflecting optical layer 3 serve to reflect light in a diffuse manner as opposed to a specular manner.

Figure 5:
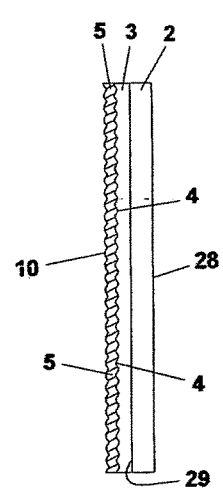
FIG. 5 is a cross-sectional diagram illustrating the application of a light transmitting reflective medium to the surface of the sprayed polymer coating illustrated in FIG. 4.

Referring now to FIG. 5, there is shown the lens construction of FIG. 4 having a reflective medium 5 applied to the peaks and valleys 4 of diffuse reflecting optical layer 3.

In accordance with one embodiment of the present invention, diffuse reflecting optical layer 3 is a hardenable light transmitting liquid polymer material that is applied by spraying the polymer material onto the surface 29 of the prefabricated light transmitting base optical substrate 2 that is then cured in an open atmospheric environment. The sprayed polymer material is applied to surface 29 as a continuous series of droplets creating a light transmitting translucent coating having a degree of surface roughness, as opposed to being a glossy smooth transparent coating. The degree of resulting surface roughness of the sprayed polymer material is represented by peaks and valleys 4. Depending on the spray method employed, the surface roughness can be controlled by adjusting spray parameters such as air pressure, viscosity of the polymer material, and proximity of the spray head to the surface of base optical substrate 2. The preferred method of creating the light transmitting diffuse reflecting optical layer 3 utilizes ultra-sonic spray nozzle technology that atomizes liquid materials into a fine mist spray using high frequency sound vibrations as opposed to high pressure, resulting in a more controllable and uniform coating. The resulting diffuse reflecting optical layer 3 may be cured at room temperature, thermally at a low or elevated temperature or by UV light, as appropriate for the type of polymer material chosen.

Figure 6:
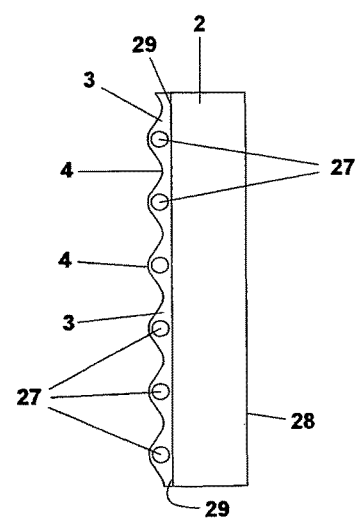
FIG. 6 is a cross-sectional diagram showing the application of a sprayed polymer coating that is impregnated with translucent particles to the surface of the optical element illustrated in FIG. 3.

In another embodiment of the present invention illustrated in FIG. 6, the polymer material used to create the diffuse reflecting optical layer 3 is mixed or impregnated with a multiplicity of light transmitting translucent particles 27 that range in size from 10 micro-inches to 1500 micro-inches. Translucent particles 27 may be, for example, polymer or glass beads. When the polymer material has cured, the translucent particles 27 create peak and valley protrusions in the surface of diffuse reflecting optical layer 3 that form the illustrated peaks and valleys 4, resulting in a light transmitting translucent coating having a degree of surface roughness, as opposed to being a glossy smooth transparent coating. In this embodiment, the polymer material provides the carrier for the light transmitting translucent particles 27 in order to provide a smooth coating transition over and between each particle protrusion. It is important that the refractive index of the light transmitting translucent particles 27 be the same as or very close to the refractive index of the diffuse reflecting optical layer 3 so that the translucent particles 27 do not cause diffraction or distortion within the diffuse reflecting optical layer 3.

If desired, the diffuse reflecting optical layer 3 can be applied to the entirety of surface 29 of the light transmitting prefabricated base optical substrate 2, or to only a selected portion thereof. For example, a portion of surface 29 can be blocked by masking, in the form of a pattern, prior to the application of the diffuse reflecting optical layer 3. After curing the diffuse reflecting optical layer 3, the masking may be removed, the resulting affect being that the reflective medium 5 will highlight the pattern resulting from the diffuse reflecting optical layer 3 that occupies only a selected portion of surface 29.

The peaks and valleys 4 of the diffuse reflecting optical layer 3 fall within a specific range. The arrangement of the peaks and valleys 4 is random and continuous over the surface area of the diffuse reflecting optical layer 3. An example of peaks and valleys arranged in a random and continuous manner is the arrangement of abrasive particles on the surface area of a sheet of common sandpaper, wherein the top of each abrasive particle represents a peak, and the surface area between a given abrasive particle and an adjacent abrasive particle represents a valley. The peaks and valleys 4 of the diffuse reflecting optical layer 3, similar to that of sandpaper, are random in that each peak and each valley does not have a specific predetermined location relative to the surface upon which it is located. The peaks and valleys 4 of the diffuse reflecting optical layer 3 and the described sandpaper are continuous in that each peak leads directly into an adjacent valley and each valley leads directly into an adjacent peak and, as such, forms a cyclical pattern that repeats itself throughout the surface of the diffuse reflecting optical layer 3. Because the diffuse reflecting optical layer 3 is a separate element from the base optical substrate 2, it is possible to create a diffuse reflecting optical construction 1 using a wider variety of base lens materials, in the fabrication of base optical substrate 2, than is allowed in the prior art. That is because the prior art requires that the peaks and valleys 4 be formed by the surface of the base optical substrate 2, which is problematic if the desired base optical substrate 2 is a polyester film, glass or an injected polymer polarized lens.

The reflective medium 5 that is applied to the peaks and valleys 4 of diffuse reflecting optical layer 3 enhances the reflective nature of the peaks and valleys 4 which reflect incident light in a diffuse or "spread out" manner that is best described as being omni-directional. The meaning of omni-directional reflection may be understood with reference to FIGS. 7A and 7B that depict the reflection created by the reflective-coated peaks and valleys 4 of the diffuse reflecting optical layer 3. Reference numeral 8 of FIGS. 7A and 7B represents incident light rays striking the diffuse reflecting optical construction 1. Reference numeral 9 of FIGS. 7A and 7B represents the light reflected from the diffuse reflecting optical construction 1. FIG. 7B illustrates incident light rays 8 and reflected light rays 9 in plan view. As illustrated in FIG. 7B, reflected light rays 9 radiate approximately equally over three hundred sixty degrees. This type of reflection is considered to be omni-directional because it radiates substantially symmetrically over three hundred sixty degrees from the point where incident light rays 8 strike the reflective-coated peaks and valleys 4 of the diffuse reflecting optical layer 3. Because the light is reflected omni-directionally, it produces an apparent reflection under a wide range of lighting conditions and viewing angles.

The peaks and valleys 4 of the diffuse reflecting optical layer 3 are defined in terms of slope angle, roughness and peak density. Rdq (root mean square of mean slope) is a measurement that refers to slope angle wherein a slope is the surface portion that extends from a given valley to an adjacent peak. Rq (root mean square roughness) is a measurement that refers to roughness or surface height variations of the peaks and valleys. RSm (mean spacing between profile peaks) is a measurement that refers to peak density. Rdq, Rq and RSm are standard measurements in the field of measuring surface roughness and physical characteristics. Essentially, the Rdq measurement is a weighted average of all the slope angles extending from the valleys to each valley's adjacent peak within a given measured line length or surface area of measurement. Similarly, Rq is a weighted average of surface roughness within a given measured line length or surface area of measurement. RSm measures the number of so-called profile peaks within a given line length or surface area of measurement.

In the case of a reflective surface of the type described herein, the performance of the reflective surface in terms of diffuseness is largely determined by the Rdq value. Shallower average slope angles result in lower Rdq values. Lower Rdq values result in reflections that are less diffuse and of higher contrast. Conversely, higher Rdq values result in reflections that are more diffuse and of decreased contrast. The individual slope angles, that is, a given slope connecting a particular valley to an adjacent peak of the peaks and valleys 4 of the preferred embodiment, are not necessarily entirely constant throughout. That is why the slope angle measurements are calculated as an average.

The Rq measurement relates to the average distance, in terms of depth, measured from the bottom of the valleys to the tops of the peaks or, in other words, the amplitude. Lower Rq values mean a shallower average depth between the tops of the peaks and the bottom of the valleys. This generally results in a finer textured finish. Conversely, greater Rq values mean a greater average depth from the tops of the peaks to the bottom of the valleys. This generally results in a coarser textured finish. It is important that a relatively low Rq value be maintained in order to minimize the potential negative effects on the optical performance due to possible mismatches in refractive indices. It has been found that peaks and valleys 4 of the type described herein having an Rdq value, Rq value, and RSm value falling within a narrowly specified range can produce good reflectivity and a sufficient amount of diffuseness in reflected light. Referring now to FIG. 8, there is shown an enlarged profile section view of a rough textured surface finish depicting peaks and valleys that make up its surface, these peaks and valleys having a given Rdq, Rq and RSm value. The illustration is simplified in that the slopes connecting the peaks and valleys are shown as being straight as opposed to varying forms and degrees of continuous arcs that would be more representative of the actual peaks and valleys 4. Nonetheless, FIG. 8 illustrates the measurements Rdq, Rq and RSm sufficient for an understanding of those parameters. Peak 17 represents a single peak, and valleys 18 and 19 represent two valleys on either side of peak 17 of the illustrated rough textured surface finish. Dimension 20 represents the line length of the rough textured surface finish that is being measured. Reference line B-B represents the mean surface elevation, also referred to as a least square line, of the peaks and valleys such that equal areas of the rough textured surface finish profile within line length 20 lie above and below it. Reference line 21 is parallel to slope 22 that extends between peak 17 and valley 18. The angle of slope 22, as indicated by angle 23 of FIG. 8, is determined by the angle between reference lines 21 and B-B. The average slope angle for the given line length 20 of the rough textured surface finish of FIG. 8 is simply the sum of all the slope angles averaged together. In a similar manner, if some or all of the slopes of a given rough textured surface finish are arcs as opposed to straight line slopes, the slope angle of each slope is provided as an average, and all of the averaged slope angles are again averaged, resulting in an average slope angle along the line length measured. FIG. 8 serves only as an illustration of what is meant by "slope angle" or "average slope angle" and is not intended as an explanation of the well-known mathematics involved in calculating the root mean square of mean slope (Rdq). Rq is determined by measuring the surface height variations, such as the distance between peak 17 and valley 18, of all the peaks and valleys measured perpendicular to reference line B-B within line length 20. As in the case of Rdq, FIG. 8 serves only as an illustration of what is meant by "surface height variations" or "roughness" and is not intended to fully explain the routine mathematics involved in calculating the root mean square roughness (Rq). RSm is determined by counting the number of profile peaks within line length 20. A profile peak is the highest point of the profile between an upward and downward crossing of a mean line such as mean line B-B. Peak 17 represents a profile peak in that peak 17 is above mean line B-B, and corresponding valleys 18 and 19 are below mean line B-B. The RSm value relates to the average distance between peaks within a given line length. It is determined by the number of profile peaks counted in a given line length divided by the line length.

The manner in which the Rdq, Rq and RSm measurements are obtained is in accordance with industry standards for surface measurements. These Rdq, Rq and RSm measurements are performed using a contact stylus measuring device and certain parameters. The parameters used for measuring the peaks and valleys 4 of the diffuse reflecting optical layer 3 and acquiring the Rdq, Rq and RSm values include stylus tip radius, spatial frequencies, data density and minimum line length to be measured. The stylus tip radius is two micrometers. The spatial frequencies are one hundred micro-inches at the lower end and thirty one-thousandths of an inch on the upper end. The data density is an industry standard of approximately one data point per ten micro-inches (or, in metric units, approximately four data points per micron) of horizontal travel across the surface being measured. The minimum line length to be measured is 0.315 inches. The Rdq of the peaks and valleys 4 of the diffuse reflecting optical layer 3 in the illustrated preferred embodiment is greater than 0.75 degrees and less than 6.5 degrees, and the Rq of the peaks and valleys 4 of the diffuse reflecting optical layer 3 in the illustrated preferred embodiment is greater than 5.9 micro-inches and less than 25.0 micro-inches. The RSm of the peaks and valleys 4 is greater than 0.0009 inches and less than 0.007 inches.

The peaks and valleys 4 of the diffuse reflecting optical layer 3 are defined by a combination of the following parameters: a) the range of Rdq, Rq and RSm of the peaks and valleys 4 in combination with the parameters set forth for measuring the peaks and valleys 4 and obtaining the Rdq, Rq and RSm values; and b) the random and continuous manner in which the peaks and valleys 4 are arranged on the surface of the diffuse reflecting optical layer 3.

One of the important benefits of the present invention is that the peaks and valleys 4 are not formed by replicating a prefabricated mold surface or an embossing mandrel or die, but instead, by spraying a layer of a liquid polymer onto the surface of a prefabricated lens or transparent sheet. A suitable polymer for creating the diffuse reflecting optical layer 3 is one that is inherently transparent, that can be applied using spray methods to the specifications required for the peaks and valleys 4, that is hardenable, that is capable of adhering to the base optical substrate 2 to which it is applied, and that is preferably flexible. A material based on polysiloxane technology, such as the types of coating materials employed as scratch resistant hard coatings, lends itself to the present application. Alternatively, a hardenable ultraviolet (UV) light-cured light transmitting optical adhesive can be used to create the sprayed diffuse reflecting optical layer 3, especially when using a lamination process as described in U.S. Pat. Nos. 7,443,608 and 7,719,777. The thickness of diffuse reflecting optical layer 3 can range from as thin as 10 micro-inches to as thick as desired but should not exceed 0.004 inches. If desired, an adhesion promoting coating may be applied to the base optical substrate 2 prior to the application of diffuse reflecting optical layer 3 in order to improve adhesion between the two elements. The spray method can be used to apply the diffuse reflecting optical layer 3 to individual lenses, goggles, transparent face shields or rolled sheet stock such as polyester film, in a continuous web operation.

With a suitable reflective medium 5, such as aluminum, applied to peaks and valleys 4 of the diffuse reflecting optical layer 3, a reflection is produced that is diffuse and substantially omni-directional. It is also substantially void of specular reflection. A reflective medium 5 may be applied using well known vacuum deposition or sputter deposition techniques. The diffuse reflecting optical layer 3 having the reflective medium 5 applied to at least a portion of its surface is referred to as prepared diffuse reflecting surface 10, shown in FIG. 5.

FIG. 2 shows the optical construction of FIG. 5 with the addition of optical layer 6 applied to the prepared diffuse reflecting surface 10. Prior to applying optical layer 6 to the prepared diffuse reflecting surface 10, the peaks and valleys 4 of the diffuse reflecting optical layer 3 distort transmitted light as would a frosted glass. That is because the refractive index of diffuse reflecting optical layer 3 that creates the peaks and valleys 4 differs greatly from the refractive index of air, the result being that light transmitted through diffuse reflecting optical layer 3 is distorted. The main purpose of optical layer 6 is to reconstitute transmitted light or, in other words, to correct the distortion of transmitted light created by the peaks and valleys 4 while allowing the reflective medium 5 to reflect through optical layer 6 and highlight the uneven surface within the diffuse reflecting optical construction 1. Optical layer 6 is selected to have a refractive index that is the same as or close to that of the polymer material used to create the diffuse reflecting optical layer 3 so that when optical layer 6 is applied to the prepared diffuse reflecting surface 10, optical layer 6 corrects the distortion and allows light to be transmitted through the completed diffuse reflecting optical construction 1 in a substantially undistorted manner.

Optical layer 6 may be created in any of a number of different ways. In one embodiment of the present invention that is based on the teachings of U.S. Pat. No. 9,244,201, a coating method is employed to create optical layer 6 by applying a flowable type of hardenable light transmitting liquid polymer material to the prepared diffuse reflecting surface 10 in liquid form in a free flowing manner that is then hardened to a solid state by curing it in an open atmospheric environment such as air. The liquid polymer material can be applied by the well known processes of flow coating, dip coating, spin coating or spray coating. Depending on the type of liquid polymer material being applied, it can, after application, be cured to a hardened state by thermal cure or exposure to ultraviolet light in an open atmospheric environment. A polysiloxane-based polymer material is preferred for use in forming optical layer 6 that conforms to and fills the areas between the peaks and valleys 4 and, as a result of surface tension, provides a substantially optically smooth outer surface 11 that reconstitutes distorted light. That is to say, the substantially optically smooth outer surface 11 is formed by surface tension rather than by a mold. Depending on the type of liquid polymer material being used in this method of free flow application and curing in an open atmospheric environment, the thickness of the cured polymer coating can range from 40 micro-inches to 600 micro-inches. Polymer coatings based on polysiloxane technology exhibit excellent physical properties of scratch and abrasion resistance, chemical resistance, and transparency with very low haze, low coating thickness, flexibility and excellent adhesion characteristics. Because of the flexibility of polysiloxane polymer coatings, issues regarding the coefficients of expansion and contraction between dissimilar materials, as related to base optical substrate 2 and optical layer 6, are of much less concern. Therefore, the base optical substrate 2 of FIG. 2 may be made of almost any type of optical material including glass and polyester films. The coating process described above does not require the use of a polished mold to achieve the optically smooth surface 11 and does not necessarily add any notable thickness or rigidity to the completed diffuse reflecting optical construction 1. This method is suitable for use in the manufacture of window films as well as goggles and lenses for eyewear.

U.S. Pat. Nos. 6,231,183 and 6,719,928 describe an insert molding method for creating the optical layer 6 that conforms to and fills the areas between the peaks and valleys 4 and creates the optically smooth outer surface 11. This prior art method is not a coating process in which a liquid polymer material is applied to the surface in a free flowing manner and then cured as a thin layer in an open atmospheric environment. Rather, it is an insert molding operation in which the optical layer 6 is cast or injection molded onto the prepared diffuse reflecting surface 10. This prior art method requires that the partial lens construction illustrated in FIG. 5 be placed inside a mold assembly for the purpose of creating a cavity between the prepared diffuse reflecting surface 10 and the optical face of an adjacent mold used to create optically smooth outer surface 11. The cavity so created is then filled with plastic material. Following curing of the plastic material, the lens construction is removed from the mold assembly. Compared to the method of applying a polymer coating that is subsequently cured in an open atmosphere, this insert molding method is much more limited in that it cannot be used to create a flexible optical layer 6 similar to the polysiloxane type polymer coating described in U.S. Pat. No. 9,244,201. Flexibility becomes an issue if the material used to fabricate the base optical substrate 2 differs from the material used to cast or injection mold the optical layer 6. For example, if the base optical substrate 2 is made of a thermoplastic material such as polycarbonate and the molded or cast optical layer 6 is made of a thermoset plastic material, such as allyl diglycol carbonate (ADC), then cracking and delamination can occur over time due to differences in expansion and contraction characteristics of the two materials. When employing the insert molding method described in U.S. Pat. Nos. 6,231,183 and 6,719,928, the base optical substrate 2 of FIG. 1 is generally limited to being made of the same material as the cast or injection molded optical layer 6. Additionally, when using the insert molding method, optical layer 6 is generally limited to being a thermoset plastic (thermoset plastics are generally processed at low pressure and relatively low temperatures), as opposed to a thermoplastic, because high process temperatures and pressures involved in the injection molding of thermoplastics are such that under most circumstances the reflective medium, such as reflective medium 5, is damaged during the process.

U.S. Pat. Nos. 7,443,608 and 7,719,777 describe a third method of filling the areas between the peaks and valleys 4 in order to create an optically smooth outer surface 11 for the purpose of reconstituting distorted light. This prior art teaches a lamination process in which a prefabricated light transmitting optical element such as a lens or transparent sheet material or film is bonded to a prepared surface, such as prepared diffuse reflecting surface 10, by first applying a light transmitting optical adhesive layer to the prepared surface and then applying the prefabricated light transmitting optical element to the adhesive layer in laminate form.

Figure 9:
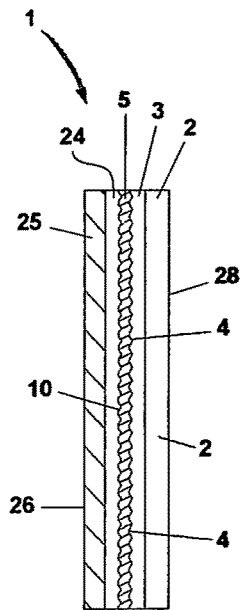
FIG. 9 is a cross-sectional view of the diffuse reflecting optical construction of FIG. 1, illustrating a variation of the diffuse reflecting optical construction of FIG. 2.

Referring now to the embodiment of the present invention illustrated in FIG. 9, the diffuse reflecting optical construction 1 of FIG. 1 is modified by replacing optical layer 6, such as a scratch resistant hard coating, with a prefabricated optical element 25 that is bonded to the prepared diffuse reflecting surface 10 by means of a light transmitting adhesive layer 24. The light transmitting adhesive layer 24 is applied to the prepared diffuse reflecting surface 10 in liquid form. The adhesive layer 24 conforms to and fills the areas between the peaks and valleys 4 of the diffuse reflecting optical layer 3 and provides a surface to which the prefabricated optical element 25 adheres. The prefabricated optical element 25 is then placed in contact with the adhesive layer 24 in laminate form. Adhesive layer 24 is then cured. It is preferred that adhesive layer 24 be an optical grade adhesive of the type that is cured by exposing it to an ultraviolet light source. The term "optical grade" simply refers to a grade of adhesive that is very clear. It is also preferred that the light transmitting adhesive layer 24 have a refractive index that is the same as or closely matches the refractive index of the light transmitting material from which the diffuse reflecting optical layer 3 is created. Adhesives for optical applications are commercially available from suppliers such as Norland Optics. Other types of light transmitting adhesives that may be employed include thermally cured adhesives, contact adhesives, epoxy adhesives and epoxy resins. The materials and process employed for laminating two prefabricated solid-state lens elements to each other are well known in the optical industry. Prefabricated optical element 25 provides an outer optically smooth surface 26. Adhesives used in optical applications, such as those supplied by Norland Optics, have a degree of flexibility and elasticity that allows for shock and vibration and expansion and contraction between the prefabricated base optical substrate 2 and prefabricated optical element 25. Thus, the present lamination method allows for the prefabricated base optical substrate 2 and the prefabricated optical element 25 of FIG. 9 to be made of dissimilar materials such as thermoset plastics, thermoplastics, glass and polyester film without exhibiting cracking or delamination. This lamination method may be employed to create diffuse reflecting optical constructions in the form of lenses for eyewear, windows or thin sheet material such as window film.

Figure 10:
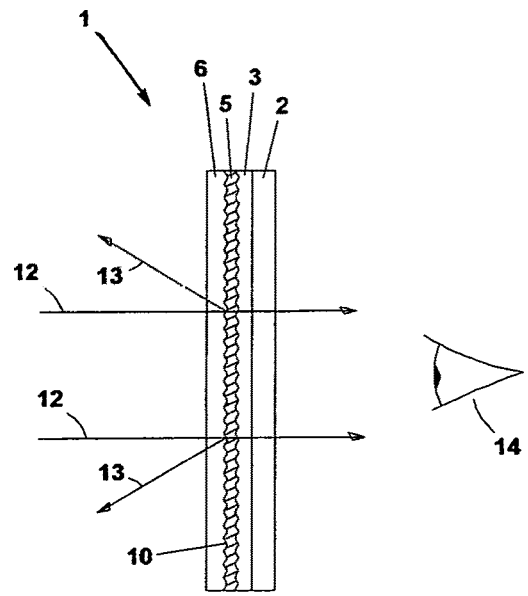
FIG. 10 is a cross-sectional diagram taken along the section line A-A of the optical construction of FIG. 1, illustrating the effects of light rays passing through the diffuse reflecting optical construction.

Only a portion of the light entering the diffuse reflecting optical construction 1 of the present invention will pass through. Some of the light will be reflected and some will be absorbed. As illustrated in FIG. 10, light rays 12 pass through the diffuse reflecting optical construction 1 to the eye 14 of a viewer. To a great extent, light rays that pass through the entirety of diffuse reflecting optical construction 1 remain parallel to one another and therefore undistorted. Upon striking the reflective medium 5 at interface 10 of FIG. 10, some of the light rays 12 are reflected by reflective medium 5 in a diffuse or scattered manner as light rays 13. Likewise, the diffuse reflecting optical construction 1 can be reversed, in which case eye 14 of the viewer is adjacent optical layer 6. In this arrangement, light rays would enter base optical substrate 2, a portion of the light rays would be reflected in a diffuse manner by reflective medium 5, and the remainder of the light rays would pass through diffuse reflecting optical construction 1 to the viewer's eye as previously described.

Figure 11:
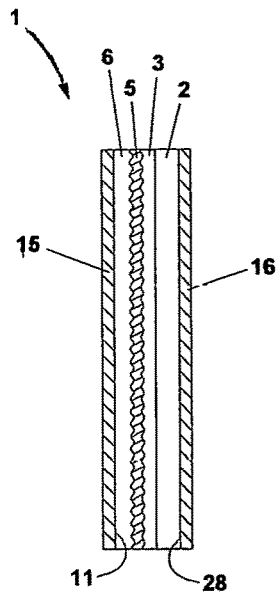
FIG. 11 is a cross-sectional diagram illustrating the application of anti-reflective coatings to the diffuse reflecting optical construction of FIG. 2.
Figure 12:
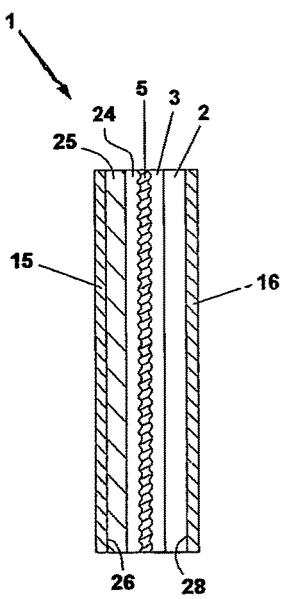
FIG. 12 is a cross-sectional diagram illustrating the application of anti-reflective coatings to the diffuse reflecting optical construction of FIG. 9.

Referring now to FIG. 11, there is shown the diffuse reflecting optical construction 1 of FIG. 2 with anti-reflective coatings 15, 16 applied to surfaces 11, 28, respectively. Referring also to FIG. 12, there is shown the diffuse reflecting optical construction 1 of FIG. 9 with anti-reflective coatings 15, 16 applied to surfaces 26, 28, respectively. Anti-reflective coatings 15, 16 serve to reduce reflections created by optically smooth surfaces 11, 28 of FIG. 2 and optically smooth surfaces 26, 28 of FIG. 9 and thus improve the optical performance of the diffuse reflecting optical construction 1. Anti-reflective coatings 15, 16 may be applied by vacuum deposition. For the purpose of attenuating transmitted light, light-absorbing tint may be incorporated into the base optical substrate 2 of FIGS. 2 and 9, optical layer 6 of FIG. 2, or optical element 25 of FIG. 9. If desired, a polarized film may be incorporated into base optical substrate 2.

The method of creating the peaks and valleys 4, described hereinabove, results in lower cost and higher production rates in the manufacture of the diffuse reflecting optical constructions 1, when compared to the prior art, because molds are not required to create the peaks and valleys 4. Diffuse reflecting optical constructions having large complex curves such as those used for spherical goggles and face shields can be created more easily because the diffuse reflecting optical layer 3 can be applied to prefabricated complex lens shapes as opposed to casting or injection molding those large complex shapes using special molds. The manufacture of thin flexible sheets, such as polyester window films, as diffuse reflecting optical constructions is simplified considerably because web-based manufacturing equipment is more easily converted to provide the spray coating process of the present invention rather than the embossing process of the prior art.

I claim:

1. A method of manufacturing a diffuse reflecting optical construction (1), comprising:

providing a prefabricated light transmitting base optical substrate (2) having first and second surfaces (29, 28);

applying a layer (3) of a first hardenable light transmitting liquid polymer, as a controllable atomized fine mist spray, onto at least a portion of said first surface (29) of said prefabricated light transmitting base optical substrate (2) such that said layer (3) becomes attached to said first surface (29) of said prefabricated light transmitting base optical substrate (2) as a random and continuous series of droplets, forming what is hereinafter referred to as diffuse reflecting optical layer (3);

curing said diffuse reflecting optical layer (3) to a solid state in an open atmospheric environment, said cured diffuse reflecting optical layer (3) having third and fourth surfaces, said third surface conforming to said first surface (29) of said prefabricated light transmitting base optical substrate (2), said fourth surface comprising a random and continuous series of peaks and valleys (4) corresponding to said random and continuous series of droplets, said fourth surface having a controllable degree of surface roughness;

applying a reflective medium (5) to at least a portion of said fourth surface of said diffuse reflecting optical layer (3), said reflective medium (5) being sufficiently thin to reflect only a fraction of light that impinges thereon, a remainder of the impinging light passing through said reflective medium (5), said reflective medium (5) applied to said fourth surface representing a prepared fourth surface of said diffuse reflecting optical layer (3);

applying an optical layer (6) of a second hardenable light transmitting liquid polymer to said prepared fourth surface of said diffuse reflecting optical layer (3); and curing said optical layer (6) to a hardened state, said optical layer (6) having a sixth surface (11) and a fifth surface, said fifth surface conforming to the random and continuous series of peaks and valleys (4) of said prepared fourth surface;

said second surface (28) of said prefabricated light transmitting base optical substrate (2) and said sixth surface (11) of said optical layer (6) forming outer surfaces of said diffuse reflecting optical construction (1).

2. A method as in claim 1 wherein said second surface (28) of said prefabricated light transmitting base optical substrate (2) is optically smooth.

3. A method as in claim 1 wherein said sixth surface (11) of said optical layer (6) is optically smooth.

4. A method as in claim 1 wherein said peaks and valleys (4) of said fourth surface of said cured reflecting optical layer (3) have a slope angle (Rdq) greater than 0.75 degrees and less than 6.5 degrees, an amplitude (Rq) greater than 5.9 micro-inches and less than 25.0 micro-inches, and a peak density (RSm) greater than 0.0009 inches and less than 0.007 inches.

5. A method as in claim 1 wherein said diffuse reflecting optical layer (3) is applied to an entirety of said first surface (29) of said prefabricated light transmitting base optical substrate (2).

6. A method as in claim 1 wherein said reflective medium (5) is applied to an entirety of said fourth surface of said cured diffuse reflecting optical layer (3).

7. A method as in claim 1 wherein said second first hardenable light transmitting liquid polymer comprises a polysiloxane polymer.

8. A method as in claim 1 wherein said second hardenable light transmitting liquid polymer comprises a polysiloxane polymer.

9. A method as in claim 1 wherein each of said first and second hardenable light transmitting liquid polymers comprises a polysiloxane polymer.

10. A method as in claim 1, further comprising applying an anti-reflective coating (16) to said second surface (28) of said prefabricated light transmitting base optical substrate (2).

11. A method as in claim 1, further comprising applying an anti-reflective coating (15) to said sixth surface (11) of said optical layer (6).

12. A method as in claim 1 wherein said diffuse reflecting optical layer (3) has a thickness greater than 10 micro-inches.

13. A method as in claim 1 wherein said optical layer (6) has a thickness greater than 40 micro-inches and less than 600 micro-inches.

14. A method as in claim 1, further comprising curing said optical layer (6) to a hardened state in an open atmospheric environment.

15. A method of manufacturing a diffuse reflecting optical construction (1), comprising:

providing a prefabricated light transmitting base optical substrate (2) having first and second surfaces (29, 28);

applying a layer (3) of a hardenable light transmitting liquid polymer, as a controllable atomized fine mist spray, onto at least a portion of said first surface (29) of said prefabricated light transmitting base optical substrate (2) such that said layer (3) becomes attached to said first surface (29) of said prefabricated light transmitting base optical substrate (2) as a random and continuous series of droplets forming what is hereinafter referred to as diffuse reflecting optical layer (3);

curing said diffuse reflecting optical layer (3) to a solid state in an open atmospheric environment, said cured diffuse reflecting optical layer (3) having third and fourth surfaces, said third surface conforming to said first surface (29) of said prefabricated light transmitting base optical substrate (2), said fourth surface comprising a random and continuous series of peaks and valleys (4) corresponding to said random and continuous series of droplets, said fourth surface having a controllable degree of surface roughness;

applying a reflective medium (5) to at least a portion of said fourth surface of said diffuse reflecting optical layer (3), said reflective medium (5) being sufficiently thin to reflect only a fraction of light that impinges thereon, a remainder of the impinging light passing through said reflective medium (5), said reflective medium (5) applied to said fourth surface representing a prepared fourth surface of said diffuse reflecting optical layer (3);

applying a light transmitting adhesive layer (24) to said prepared fourth surface of said diffuse reflecting optical layer (3), said light transmitting adhesive layer (24) having fifth and sixth surfaces, said fifth surface conforming to said peaks and valleys (4) of said prepared fourth surface of said diffuse reflecting optical layer (3); and providing a prefabricated light transmitting optical element (25) having a seventh surface and an eighth surface (26), said seventh surface being laminated to said sixth surface of said light transmitting adhesive layer (24);

said second surface (28) of said prefabricated light transmitting base optical substrate (2) and said eighth surface (26) of said prefabricated light transmitting optical element (25) forming outer surfaces of said diffuse reflecting optical construction (1).

16. A method as in claim 15 wherein said outer second surface (28) of said prefabricated light transmitting base optical substrate (2) is optically smooth.

17. A method as in claim 15 wherein said outer eighth surface (26) of said prefabricated light transmitting optical element (25) is optically smooth.

18. A method as in claim 15 wherein said peaks and valleys (4) of said fourth surface of said cured reflecting optical layer (3) have a slope angle (Rdq) greater than 0.75 degrees and less than 6.5 degrees, an amplitude (Rq) greater than 5.9 micro-inches and less than 25.0 micro-inches, and a peak density (RSm) greater than 0.0009 inches and less than 0.007 inches.

19. A method as in claim 15 wherein said optical layer (3) is applied to an entirety of said first surface (29) of said prefabricated light transmitting base optical substrate (2).

20. A method as in claim 15 wherein said reflective medium (5) is applied to an entirety of said fourth surface of said cured diffuse reflecting optical layer (3).

21. A method as in claim 15 wherein said hardenable light transmitting liquid polymer comprises a polysiloxane polymer.

22. A method as in claim 15, further comprising applying an anti-reflective coating (15) to said outer eighth surface (26) of said prefabricated light transmitting optical element (25).

23. A method as in claim 15, further comprising applying an anti-reflective coating (16) to said outer second surface (28) of said prefabricated light transmitting base optical substrate (2).

24. A method as in claim 15 wherein said diffuse reflecting optical layer (3) has a thickness greater than 10 micro-inches.

* * * * *